United States Patent [19]

Seifert

[11] 4,290,256

[45] Sep. 22, 1981

[54] SINGLE CABLE CONTROL SYSTEM FOR LAWN MOWER

[76] Inventor: Lester H. Seifert, R.R. #2, Park Ave., Kiel, Wis. 53042

[21] Appl. No.: 101,617

[22] Filed: Dec. 10, 1979

[51] Int. Cl.$^3$ ............................................. A01D 55/18
[52] U.S. Cl. .................................... 56/11.3; 192/17 R
[58] Field of Search ................... 56/11.3; 192/105 BA, 192/17 R, 17 A, 17 C, 99 R, 99 B

[56] References Cited

U.S. PATENT DOCUMENTS

| | | | |
|---|---|---|---|
| 4,006,528 | 2/1977 | Katsuya | 192/17 |
| 4,035,994 | 7/1977 | Hoff | 192/17 R |
| 4,044,533 | 8/1977 | Wick | 192/17 R |
| 4,141,439 | 2/1979 | Lunde et al. | 56/11.3 |

*Primary Examiner*—Robert A. Hafer
*Attorney, Agent, or Firm*—Andrus, Sceales, Starke & Sawall

[57] ABSTRACT

A throttle and brake control mechanism for a rotary lawnmower which is actuated by a single operating cable system. A centrifugal clutch interconnects the engine with the rotary blade of the lawnmower and the clutch includes an outer drum that is connected directly to the blade. On disengagement of the clutch at low throttle speeds, a brake acts to engage the clutch drum to stop free rotation of the drum and blade. The brake is released by an operating cable mechanism which interconnects a throttle operating lever mounted on the handle of the mower with the throttle on the engine. Movement of the operating lever from the idle position toward the full throttle position will initially release the brake from engagement with the clutch drum, and thereafter will operate the throttle to increase the engine speed, enabling the clutch to move to the engaged position to cause rotation of the blade.

13 Claims, 11 Drawing Figures

Fig. 6

SINGLE CABLE CONTROL SYSTEM FOR LAWN MOWER

BACKGROUND OF THE INVENTION

In the past, certain rotary lawnmowers have incorporated a centrifugal clutch which interconnects the engine with the rotating blade. When the engine speed increases from idle to a predetermined value, the centrifugal clutch will move to an engaged position to interconnect the blade with the engine and cause the blade to rotate. On a decrease in engine speed, the clutch will disengage and, the blade will freely rotate to a stop. During this period of free rotation, there have been instances of injury to the operator, who, thinking the blade had stopped rotating, had reached under the housing.

To remedy this situation, brake mechanisms have been incorporated with the clutch, and in lawn mowers of this type, the brake is operated on disengagement of the clutch to prevent free rotation of the blade. Lawn mowers utilizing a clutch and brake mechanism have a dual operating cable system, with one cable serving to operate the throttle and a second cable serving to operate the brake.

Recently lawn mowers have been constructed with a spring loaded, throttle operating lever mounted on the upper end of the handle. The operating lever is spring biased to an idle position, and the engine speed is increased by moving the lever toward the full throttle position against the force of the spring. On release of the operating lever, the lever will automatically be returned to the idle position. To provide added safety and prevent accidental operation of the lever, a two-step actuation system has been incorporated with the operating lever. With systems of this type, the operating lever is locked in the idle position and the operator must initially release the lock and them move the operating lever to the full throttle position. With systems of this type, it takes two conscious movements on the part of the operator to increase the engine speed through operation of the lever.

SUMMARY OF THE INVENTION

The invention is directed to an improved control system for a rotary lawn mower in which a single operating cable mechanism is utilized to actuate both the brake and the throttle. In accordance with the invention, a centrifugal clutch interconnects the drive shaft of the engine with the rotary blade of the mower and the clutch includes an outer drum which is directly interconnected with the blade.

On disengagement of the clutch at low throttle, a brake, which is pivoted to the deck of the mower, engages the outer surface of the clutch drum to stop free rotation of the drum and blade. The brake is moved to the released position by means of a cable mechanism which interconnects the throttle on the engine and an operating lever which is mounted on the upper end of the handle of the lawn mower.

The throttle is biased toward the idle position by a spring which is connected to the operating cable, and this in turn, biases the operating lever on the handle to the idle position. On movement of the operating lever from the idle position toward the full throttle position, an abutment on the operating cable engages the end of the brake to pivot the brake to the released position. Continued movement of the operating lever toward the full throttle position will then operate the throttle on the engine to increase the engine speed. When the speed has reached a predetermined level, the clutch will move to the engaged position to interconnect the engine and the rotary blade to drive the blade.

As a feature of the invention, there is a predetermined amount of play or lost motion on initial movement of the operating lever and cable from the idle position toward the full throttle position. This lost motion compensates for wear of the brake pad or shoe, and insures that the brake will fully engage the rotating drum of the clutch even after extended periods of service and wear of the brake pad.

The operating cable is connected to the throttle on the engine through a compensating extension spring. The spring functions to permit a predetermined amount of movement of the cable without corresponding movement of the throttle, and thereby insures that the brake will be moved to the released position before the throttle is moved toward the full throttle position. Thus, there is no possibility of the clutch being engaged before the brake is released.

The centrifugal clutch is composed of a pair of thin rotor plates which are provided with a contour so that the outer portion of the plates will bend or deflect outwardly by centrifugal motion. Weighted clutch elements are connected to the opposite faces of the rotor plates and the outer periphery of each element carries a pad which is adapted to engage the inner surface of the clutch drum to provide an engaged condition. A driving disc is mounted on the outer surface of each rotor plate, and the drive shaft of the engine extends through aligned non-circular openings in the rotor plates and driving discs. Each driving disc is provided with an outwardly extending nose having a projection which is received with a recess in the respective rotor plate. The combination of the driving discs and the rotor plates provides an inexpensive non-machined driving connection of substantial axial length between the drive shaft and the clutch.

With the construction of the invention, the brake will operate in less than a second to stop free rotation of the blade on disengagement of the clutch.

A reduction mechanism is associated with the operating cable so that a relatively large amount of pivotal movement of the operating lever on the handle will produce a relatively short movement of the cable at the throttle. Due to this reduction, the force required to be exerted by the operator to maintain the operating lever in the full throttle position is minimized.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

The drawings illustrate a rotary lawn mower including a housing 1 which is supported from the ground by wheels 2. An engine 3 is mounted on the upper surface of the housing and serves to drive a rotary blade 4 mounted within the housing. To push the mower over the ground, a handle 5 is connected to the rear portion of the housing.

Figure 2:
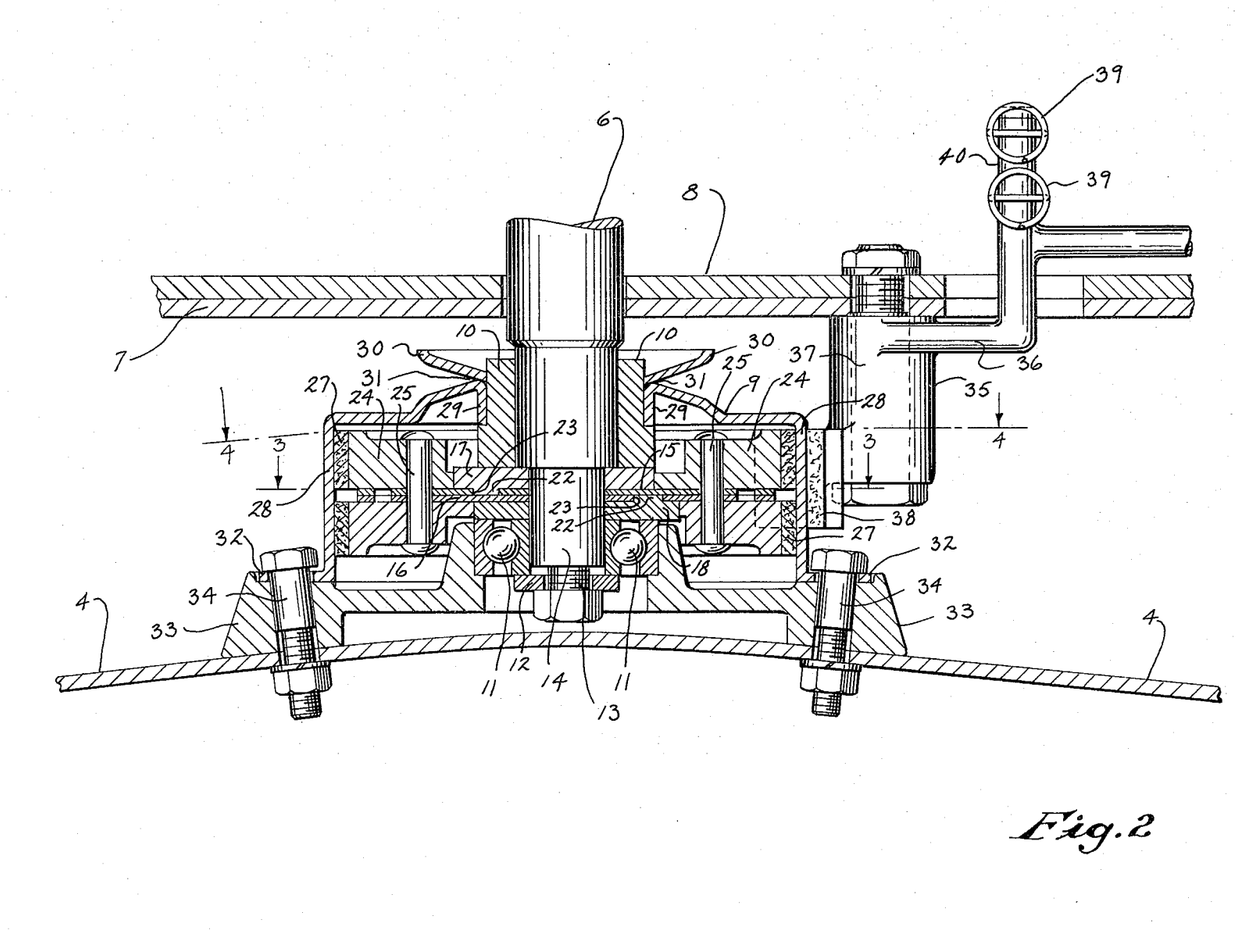
FIG. 2 is a vertical section showing the clutch and brake construction.

As shown in FIG. 2, the drive shaft 6 of the engine extends through aligned openings in the deck plate 7 of the housing and an adapter plate 8, which is mounted on the upper surface of the deck plate, and the drive shaft is connected through a centrifugal clutch unit to the blade 4.

Figure 3:
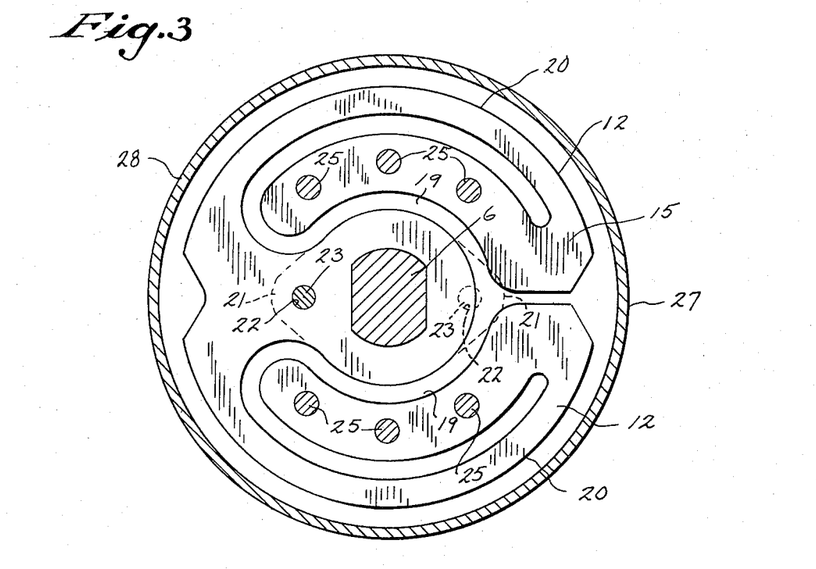
FIG. 3 is a section taken along line 3—3 of FIG. 2 and showing the clutch rotor plates and driving discs.

As illustrated in FIG. 2, the drive shaft 6 is journalled within a sleeve bearing 10 and within a ball bearing assembly indicated generally by 11, both of which are contained within the clutch unit 9. A washer 12 and bolt 13, which is threaded into the lower end of the drive shaft 6, retain the bearing 11 in position. The lower section 14 of the drive shaft has a non-circular configuration, as best shown in FIG. 3, and is received within aligned non-circular holes in rotor plates 15 and 16 and driving discs 17 and 18, which are located on opposite sides of the rotor plates. The rotor plates, as best shown in FIG. 3, are formed of thin metal and are disposed flatwise to each other. Each rotor plate is provided with a generally curved recess, indicated generally by 19, which permits the outer section 20 of each rotor plate to be deflected outwardly when the rotor blades are rotated at high speed.

Each driving disc 17 and 18 is provided with an extension or nose 21 and the noses face in opposite directions to provide proper dynamic balance for the clutch. Each extension or nose 21 is formed with a downwardly extending dimple or projection 22, which is received within a recess 23 in the corresponding rotor blade. The use of the thin rotor plates 15 and 16, in combination with the driving discs 17 and 18 provides a simple and inexpensive manner of providing a substantial axial length for the driving connection of the clutch to the drive shaft.

Figure 4:
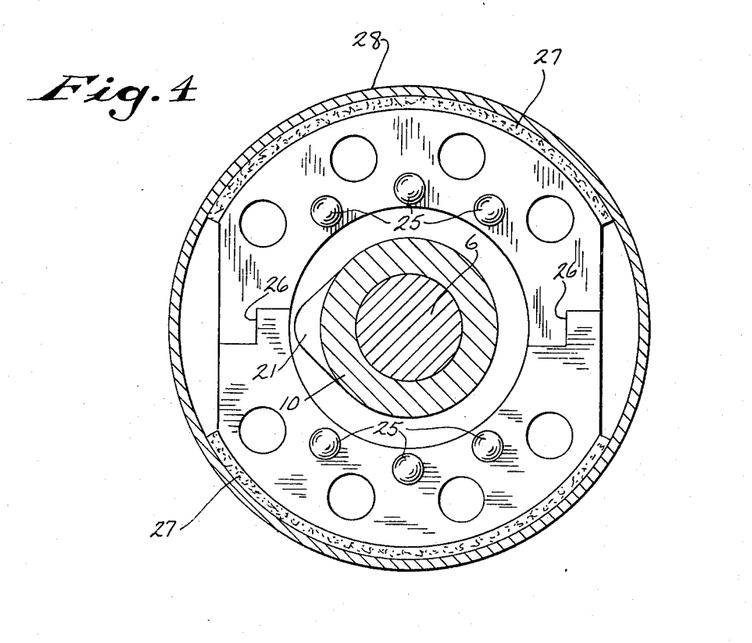
FIG. 4 is a section taken along lines 4—4 of FIG. 2 and showing the clutch elements.

A pair of clutch elements or shoes 24 are mounted to the outer surface of each rotor plate 15 and 16 by a series of rivets 25, and the inner portions of each pair of shoes are connected together by a step-joint, indicated by 26. Pads 27 are mounted on the outer surface of each of the shoes 24. The step-joint 26 maintains alignment of the clutch shoes 24 and insures that the shoes will move outwardly in a radial path to provide a uniform contact with the inner surface of clutch drum 28.

The drum 28 has an inverted cup shape, and the upper end is provided with a downwardly extending flange 29 which engages the bearing 10. A sheet metal flange 30 can be secured to the upper edge of the drum 28, and the flange 30 and the upper surface of the drum define a V-shaped groove 31 which serves as a pulley in the event that the mower is to be a self-propelled type.

The lower edge of the drum 28 is provided with and outwardly extending flange 32 which is connected through adapter plate 33, to the cutting blade 4, by bolts 34. With this construction, the clutch drum 28 is integrally connected to the blade 4.

At idle speed of the engine the clutch shoes 24 will be out of engagement with the clutch drum 28, so that rotation of the drive shaft will not be imparted to the drum 28 and the blade 4. As the engine speed is increased to a predetermined value, the rotor plates 15 and 16 will be deformed outwardly, moving the clutch shoes 24 into engagement with the drum 28, thereby providing a driving connection between the drive shaft 6 and the rotor blade 4.

Figure 5:
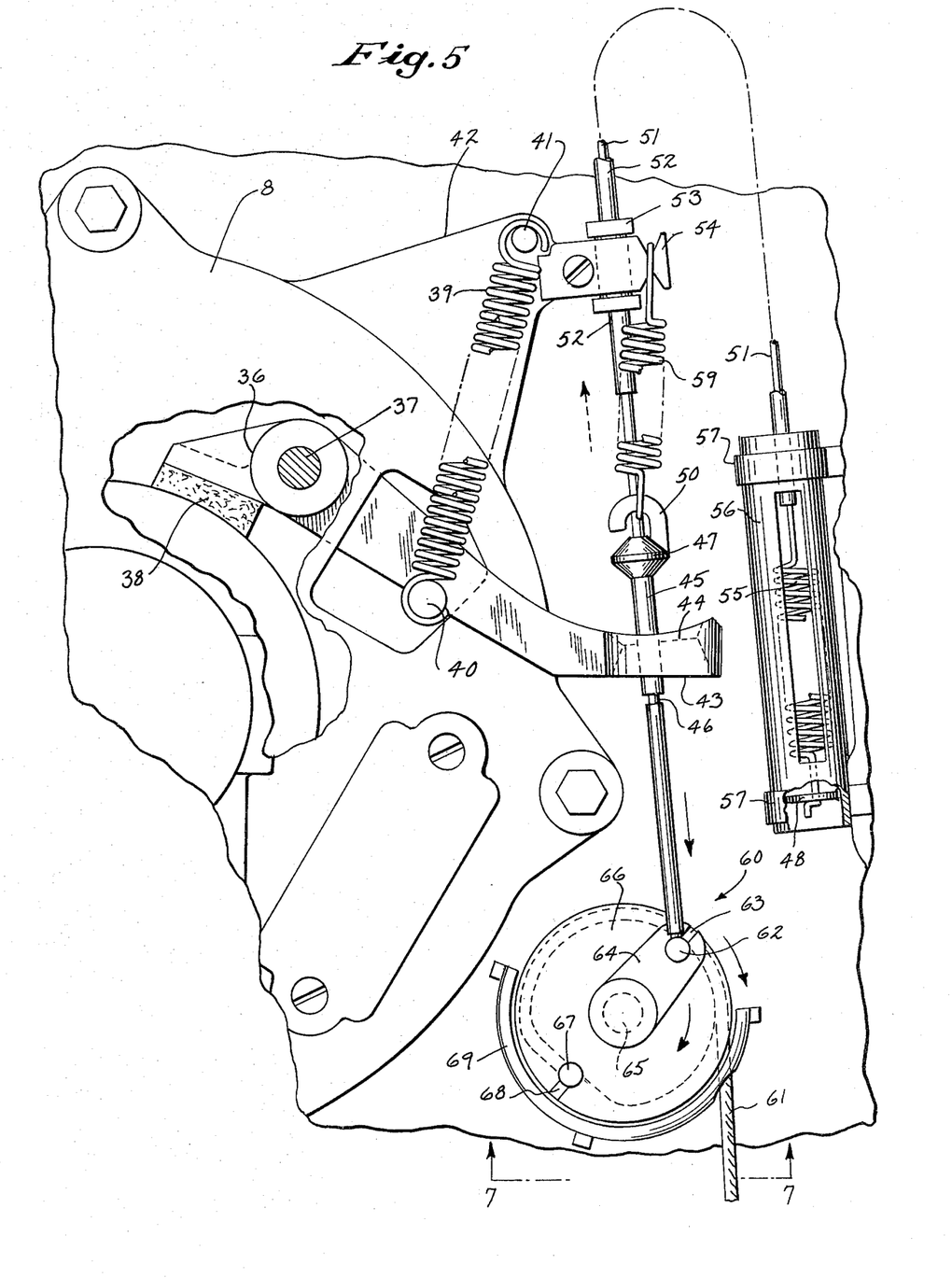
FIG. 5 is a horizontal section showing the connection of the operating cable to the brake mechanism and throttle lever with the brake in the engaged position.
Figure 6:
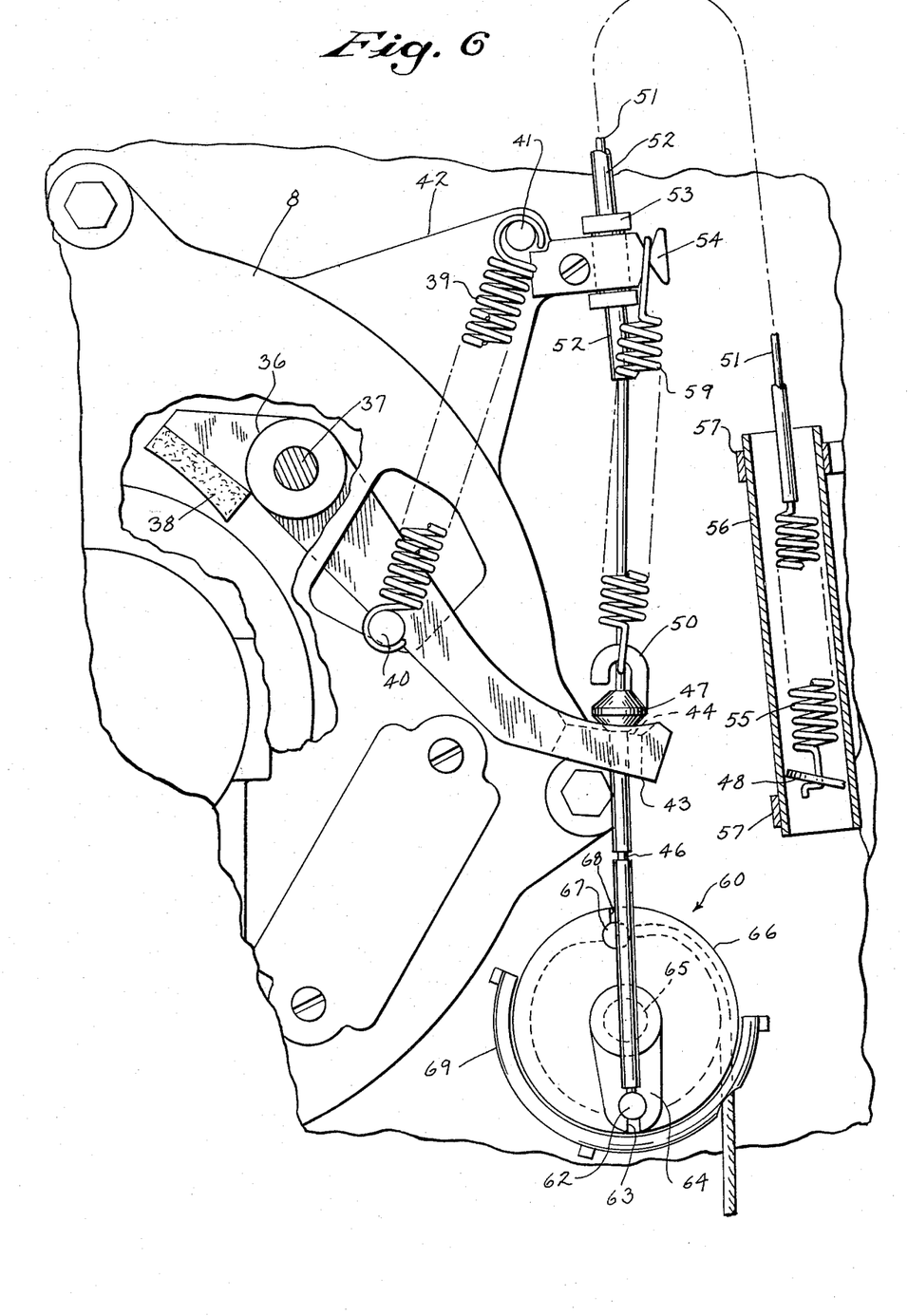
FIG. 6 is a view similar to FIG. 5 showing the brake in the released position.
Figure 7:
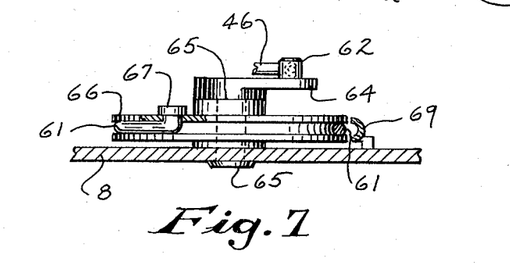
FIG. 7 is a section taken along line 7—7 of FIG. 5.

A brake assembly 35 is adapted to engage the outer surface of clutch drum 28 to stop free rotation of the drum and the blade 4 when the clutch unit 9 is disengaged. The brake assembly 35 includes a brake lever 36 which is pivoted to the deck plate 7 by a pivot shaft 37. The end of the lever 36 carries a brake pad or shoe 38 which is adapted to engage the outer surface of the clutch drum 28, while the central portion of lever 36 extends upwardly through aligned openings in the deck plate and adapter plate 8. To urge the brake lever 36 to the braking position, a pair of springs 39 are interconnected between an upstanding pin 40 on lever 36 and a pin 41 which extends upwardly from an extension 42 on the adapter plate 8. The use of a pair of springs 39 decreases the reaction time for moving the brake lever 36 to the braking position and provides a safety function. In the event one spring should break, the remaining spring will provide the braking action.

The outer end of the brake lever, which is located above adapter plate 8, is provided with an elongated hole 43 which defines a seat 44. A sleeve 45 which is secured to the operating cable 46 is mounted for movement within the hole 43, and the sleeve is provided with an enlarged head 47 which is adapted to engage the seat 44 when the cable is moved in the direction of the arrow, as shown in FIG. 5. Engagement of head 47 with the seat 44 will pivot the brake lever 36 against the face of springs 39 to move the brake pad out of contact with the clutch drum 28 so that subsequent engagement of the clutch will act to drive the blade 4.

One end of the cable 46 is connected to the throttle lever 48 on the engine 3, while the opposite end of the operating cable is connected to a throttle operating lever 49 on the handle 5, as will be described hereinafter.

The head 47 is provided with a hook 50, and one end of a cable or wire 51 is connected to the hook. The wire is disposed within a plastic sleeve 52, which is mounted for sliding movement within a tube 53 that is carried by a mounting bracket 54 attached to the extension 42 on the adapter plate 8. The opposite end of wire 51 is integrally connected to one end of an extension spring 55 while the opposite end of the extension spring is connected to the throttle lever 48, of the engine. As the wire 51 is moved in the direction of the arrow in FIG. 5, the throttle lever 48 will be moved from the idle position toward the full throttle position.

To prevent buckling or deformation of the spring 55, the spring can be retained within a tube 56 which is attached to the engine by brackets 57. Tube 56 is formed with an elongated window or slot so that the position of the spring can be viewed.

The throttle lever 48 is urged to the idle position by a spring 59 which is interconnected between the bracket 54 and the hook 50 on the head 47 of the sleeve 45 which is connected to the operating cable 46. With this construction the force of spring 59 urges the operating cable 46 and wire 51 in the direction of the dashed arrow in FIG. 5, thus, biasing the throttle lever 48 to the idle position.

The spring 55 functions as a compensating spring to permit a predetermined amount of movement of the operating cable 46 without corresponding movement of the throttle lever 48, thus insuring that the head 47 will engage the brake lever 36 to move the brake lever to the released position before the wire 51, moves the throttle lever 48 from the idle position. Thus, the brake will be fully released before the engine speed is increased to a point where the clutch will engage.

The cable 46, which is connected to the brake operating sleeve 45 is connected through a reducing mechanism, as indicated generally by 60, to cable 61, which extends from the housing 1 to the handle 5. As shown in FIG. 5, an end of the cable 46 is provided with an enlarged head 62 which is secured within a notch 63 in arm 64 that is secured to the shaft 65 of pulley 66. The pulley shaft 65 is mounted for rotation on the adapter plate 8, and the end of the cable 61 is provided with an enlarged head 67 which is received within a slot 68 in the periphery of the pulley. A generally curved guide member 69 is mounted on the adapter plate 8 in spaced relationship to the periphery of the pulley 66 to maintain the cable 61 in engagement with the pulley. With this mechanism, a pull on the cable 61 will cause rotation of the pulley 66 and corresponding pivotal movement of the arm 64 to move the cable 46. Due to the geometry, a reduction in movement is provided, with the cable 46 moving approximately ½ the length of the movement of the cable 61.

The cable 61 is passed through suitable guides on the housing and the U-shaped handle 5, and the upper end of the cable passes over a pulley 70, which is mounted for rotation on bolt 71 connected to the handle, then passes through a loop 72 on locking member 73, then travels over a pulley 74, which is mounted for rotation on bolt 75 connected to the handle, and is dead-ended on the threaded stud located on the lower edge of the locking member 73.

Figure 1:
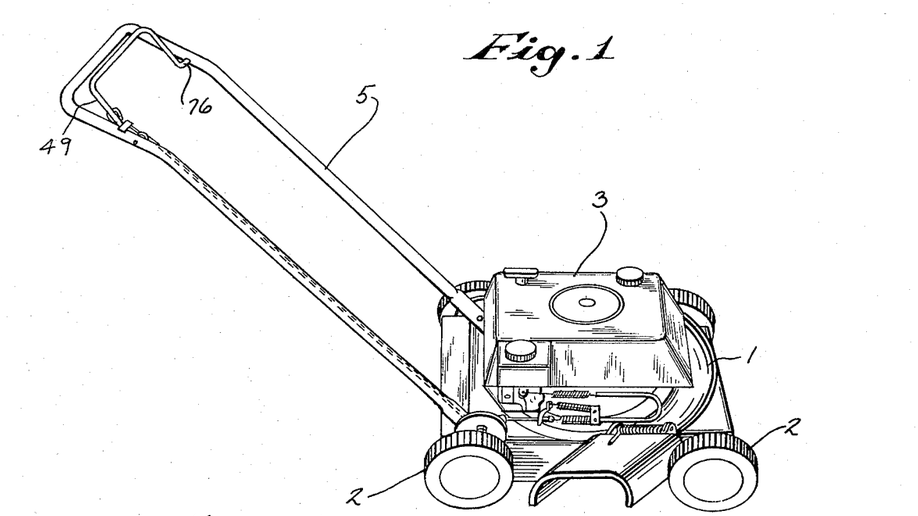
FIG. 1 is a perspective view of a lawn mower incorporating the control mechanism of the invention.
Figures 8, 9:
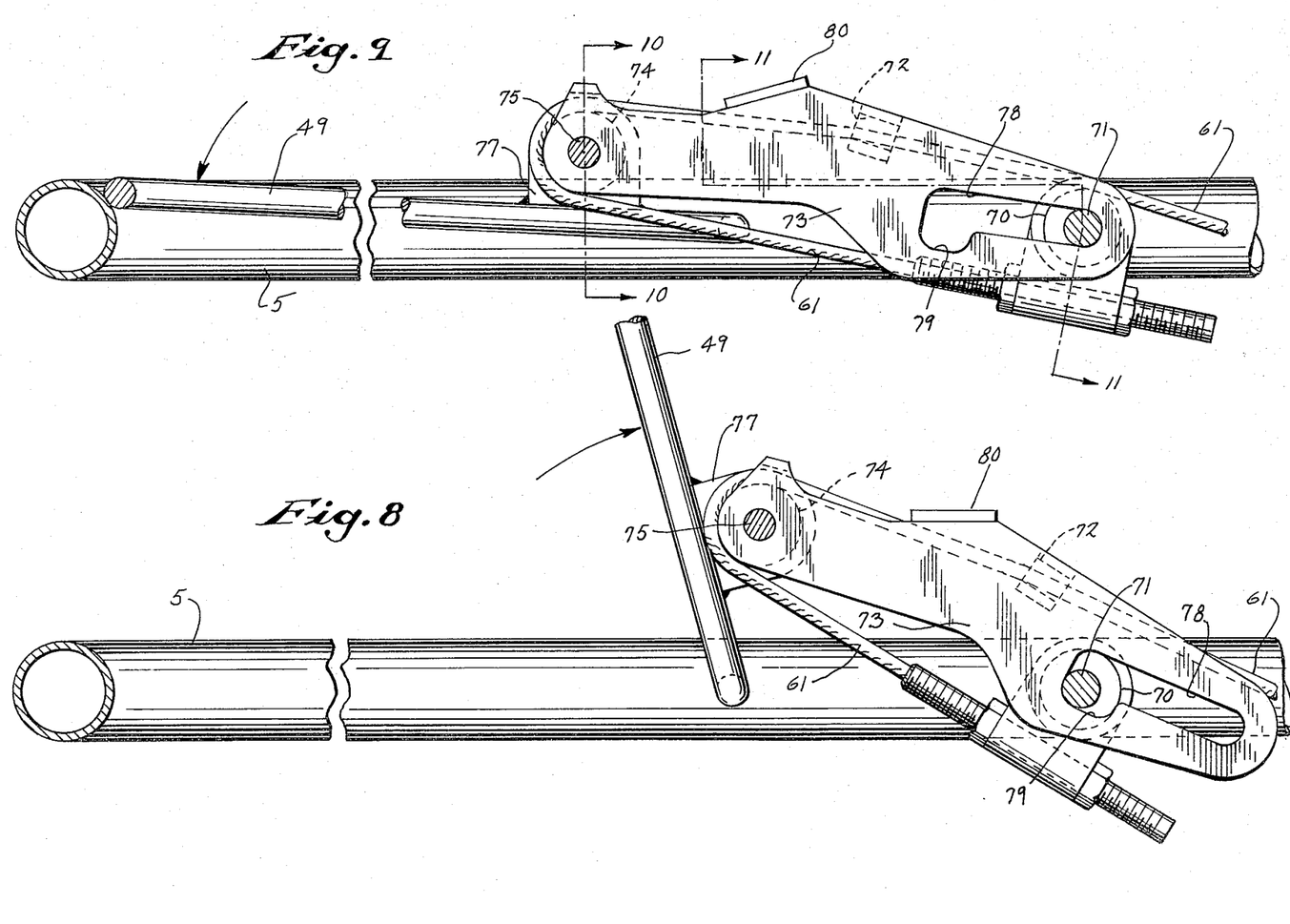
FIG. 8 is a side elevation showing the control lever on the handle, with the control lever being in the idle position.
FIG. 9 is a view similar to FIG. 8 showing the control lever in the full throttle position.
Figure 10:
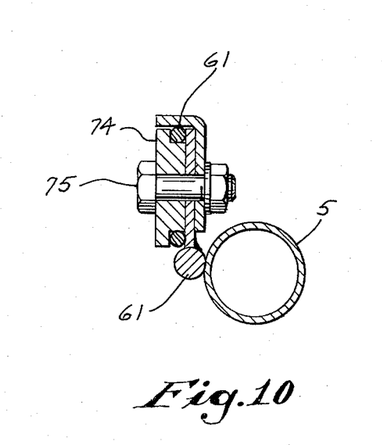
FIG. 10 is a section taken along line 10—10 of FIG. 8.
Figure 11:
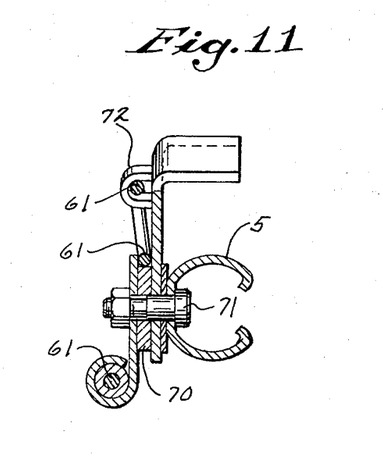
FIG. 11 is a section taken along line 11—11 of FIG. 8.

The throttle operating lever 49 is pivotally connected to the handle 5. As illustrated in FIG. 1, the control lever 49 has a generally U-shaped, with the ends of the lever being provided with outwardly extending projections 76 which are received within suitable holes in opposite sides of the handle. The operating lever 49 is movable from an idle position, in which the lever is located at an angle of approximately 45° with respect to the plane of the handle 5, as shown in FIG. 8, to a full throttle position where the lever 49 lies approximately in the plane of the handle, as shown in FIG. 9. As the operating lever 48 is moved from the idle to the full throttle position, the cable 46 will be moved in the direction of the arrow in FIG. 5, and conversely, as the control lever 49 is released, the spring 59 will move the cable 46 in the direction of the dashed arrow in FIG. 5 to thereby return the operating lever to the idle position.

The control mechanism is designed so that two separate and conscious acts are required to move the operating lever 49 toward the full throttle position. More specifically, the locking lever 73 will hold the operating lever 49 in the idle position, and the locking lever must be manually released before the operating lever can be moved to the full throttle position. In this regard, the bolt 75 provides a connection between the upper end of the locking lever 73 and an upstanding tab 77 on the lever 49. In addition, the bolt 71 extends through an elongated slot 78 in the end of the locking lever 73, and, as shown in FIG. 8, the slot is provided with an enlarged base 79. When the lever 49 is in the idle position, the bolt 71 is biased into the base 79 of slot 78 by the tension on cable 61, preventing pivotal movement of the locking lever 73 and the operating lever 49.

To release the locking lever 73, the operator pushes down on the flange 80 of the locking lever, causing the lower end of the locking lever to move downwardly and bringing bolt 71 into alignment with the elongated slot 78. With the bolt 71 aligned along the axis of the slot 78, the lever 49 can be pivoted toward the full throttle position, as shown in FIG. 9. This construction requires two conscious acts on the part of the operator to increase the engine speed from idle, and prevents accidental movement of operating lever 49 to the full throttle position.

After starting the engine, the throttle lever 43 will be biased to the idle position by the force of spring 59 and the operating lever 48 will be in the angular idle position, as shown in FIG. 8. The brake lever 36 at this time is in the engaged position as shown in FIG. 5.

To increase the engine speed, the operator initially pushes down on locking lever 73 to release the locking lever and then pulls down on the operating lever 49. Downward movement of lever 49 causes cable 61 to move rearwardly and this movement of cable 61 acts through the reduction mechanism 60 to move cable 46 to the rear, as shown by the arrow in FIG. 5.

As the head 47 is spaced out of contact with seat 44 on brake lever 36, initial movement of cable 46 will not be transmitted to brake lever 36. After a pre-set amount of movement of cable 46, head 47 will engage seat 44 to pivot the brake lever 36 and move the brake pad 38 out of engagement with the clutch drum 28. The spaced connection between head 47 and seat 44 serves to compensate for wear of the brake pad 38, and insures that the pad will be urged into tight engagement with drum 28, regardless of the wear of the pad.

The compensating spring 55 is designed so that the spring will extend, without movement being imparted to throttle lever 48, until after the brake lever 36 is released, thereby insuring that the brake is released before the engine speed is increased.

After release of the brake, the throttle lever 48 on the engine will be moved toward the full throttle position by movement of wire 51 and when the engine speed increases to a predetermined value, the clutch 9 will engage to impart rotation to blade 4.

On release of the operating lever 49, the spring 55 will move the cable 46 in the forward direction, thereby moving the throttle lever 48 toward the idle position. As the engine speed decreases, the clutch will disengage, and the brake lever 36 will be pivoted by spring 39 to the engaged position to immediately stop free rotation of the clutch drum 28 and blade 4. In practice, the blade will normally be stopped within one second of release of the operating lever 49.

With the invention, a single operating cable system is utilized to control both the throttle and the brake. The reduction mechanism, which is incorporated in the cable system, minimizes the force required to be exerted by the operator to move the operating lever to the full throttle position.

The lost motion connection between the cable system and the brake compensates for wear of the brake pad, while the use of the extension spring 55 in the cable system insures that the brake will be released before the engine speed is increased to a point necessary to engage the clutch.

Various modes of carrying out the invention are contemplated as being within the scope of the following claims particularly pointing out and distinctly claiming the subject matter which is regarded as the invention.

I claim:

1. A rotary lawn mower, comprising a housing, a handle connected to the housing, drive means mounted on the housing and having a drive shaft and having a throttle member on the engine for controlling the speed of the engine, said throttle member being movable between an idle position and a full throttle position, a rotary cutting blade disposed within the housing, clutch means disposed within the housing and interconnecting the drive shaft and the blade and including a clutch member connected to the blade, brake means disposed within the housing and movable between a braking position in which the brake means is engaged with said clutch member to stop free rotation of said clutch member and said blade and a released position in which the brake means is out of contact with said clutch member, throttle operating means mounted on the handle and movable between an idle position and a full throttle position, cable means interconnecting the throttle operating means and the throttle member, biasing means for biasing the brake means to the braking position, brake actuating means connected to the cable means for moving the brake means to the released position on movement of the throttle operating means from the idle position toward the full throttle position to thereby enable said clutch means to provide a driving connection between the drive shaft and the blade, and an extendible member connected to said cable means between said brake actuating means and said throttle member, movement of the throttle operating means from the idle position toward the full throttle position causing said extendible member to extend without a corresponding movement of said throttle member to thereby insure that the brake means is released before the engine speed is increased.

2. The lawn mower of claim 1, wherein said clutch means is a centrifugal clutch.

3. The lawn mower of claim 1, wherein said throttle operating means is pivotally connected to the handle.

4. The lawn mower of claim 3, and including releasible locking means engageable with the throttle operating means to lock said throttle operating means in the idle position.

5. The lawm mower of claim 4, wherein said locking means is movable between a locking position and a released position, said cable means being disposed to bias said locking means in the locking position.

6. The lawn mower of claim 5, wherein said locking means includes a locking lever connected at one end to said throttle operating means, the opposite end of said locking lever being pivotally connected to said handle at a location spaced from the pivotal connection of the throttle operating means to said handle, the pivotal connection of said locking lever to said handle including a pivot pin secured to one of said locking lever and the handle and an elongated slot formed in the other of said locking lever and the handle and disposed to receive the pin, said slot having a notch therein, said cable means acting to bias the pin in said notch to prevent pivotal movement of said locking lever and said throttle operating means relative to said handle, manual movement of the locking lever serving to release said pin from said notch, whereby the throttle operating means can be pivoted from the idle position to the full throttle position.

7. A rotary lawn mower, comprising a housing, a handle connected to the housing, drive means mounted on the housing and having a drive shaft and having a throttle member on the engine for controlling the speed of the engine, said throttle member being movable between an idle position and a full throttle position, a rotary cutting blade disposed within the housing, clutch means disposed within the housing and interconnecting the drive shaft and the blade and including a clutch member connected to the blade, brake means disposed within the housing and movable between a braking position in which the brake means is engaged with said clutch member to stop free rotation of said clutch member and said blade and a released position in which the brake means is out of contact with said clutch member, throttle operating means mounted on the handle and movable between an idle position and a full throttle position, cable means interconnecting the throttle operating means and the throttle member, biasing means for biasing the throttle member and the throttle operating means to the respective idle positions, brake actuating means connected to the cable means, and means responsive to a first predetermined distance of movement of the throttle operating means from the idle position toward the full throttle position for releasing said brake means to thereby enable said clutch means to provide a driving connection between the drive shaft and the blade, and means responsive to a second predetermined distance of movement of the throttle operating means from the idle position toward the full throttle position for moving said throttle member from its idle position toward its full throttle position, said second distance being greater than said first distance whereby the brake means will be released before the throttle member is actuated to increase the engine speed.

8. The lawn mower of claim 7, wherein said means responsive to a second predetermined distance of movement comprises an extension spring connected in said cable means adjacent said throttle member.

9. The lawn mower of claim 7, and including motion reduction means associated with said cable means and disposed between said throttle operating means and said brake actuating means, said motion reduction means acting to reduce the magnitude of movement of the cable means as imparted to the cable means by movement of said throttle operating means.

10. The lawn mower of claim 9, wherein said cable means includes a first cable having one end connected to the throttle operating means and includes a second cable having one end connected to said throttle member, said motion reduction means interconnecting said cables and comprising a pulley mounted for rotation with respect to the housing, the opposite end of said first cable being connected to said pulley, and a link pivotally interconnecting the axis of rotation of said pulley with the opposite end of said second cable.

11. A rotary lawn mower, comprising a housing, a handle connected to the housing, drive means mounted on the housing and having a drive shaft and having a throttle member on the engine for controlling the speed of the engine, said throttle member being movable between an idle position and a full throttle position, a rotary cutting blade disposed within the housing, clutch means disposed within the housing and interconnecting the drive shaft and the blade and including a clutch member connected to the blade, brake means disposed within the housing and movable between a braking position in which the brake means is engaged with said clutch member to stop free rotation of said clutch member and said blade and a released position in which the brake means is out of contact with said clutch member, throttle operating means mounted on the handle and movable between an idle position and a full throttle position, cable means interconnecting the throttle operating means and the throttle member, biasing means for biasing the brake means to the braking position, brake actuating means connected to the cable means for moving the brake means to the released position on movement of the throttle operating means from the idle position toward the full throttle position to thereby enable said clutch means to provide a driving connection between the drive shaft and the blade, said throttle operating means including a manually actuated throttle operating member pivotally connected to the handle and attached to said cable means, and releasable locking means disposed on the handle and engageable with the throttle operating means for locking the throttle operating means in the idle position, said locking means being manually movable to a release position to enable said throttle operating means to be moved toward the full throttle position.

12. The lawn mower of claim 11, wherein said throttle operating means also includes a pulley mounted on said throttle operating member, said cable means passing over the pulley and being dead-ended on said handle, said locking means being engageable with the throttle operating member to prevent pivotal movement of said throttle operating member.

13. A rotary lawn mower, comprising a housing, a handle connected to the housing, drive means mounted on the housing and having a drive shaft and having a throttle member on the engine for controlling the speed of the engine, said throttle member being movable between an idle position and a full throttle position, a rotary cutting blade disposed within the housing, clutch means disposed within the housing and interconnecting the drive shaft and the blade and including a clutch member connected to the blade, brake means disposed within the housing and movable between a braking position in which the brake means is engaged with said clutch member to stop free rotation of said clutch member and said blade and a released position in which the brake means is out of contact with said clutch member, throttle operating means mounted on the handle and movable between an idle position and a full throttle position, cable means interconnecting the throttle operating means and the throttle member, biasing means for biasing the brake means to the braking position, brake actuating means connected to the cable means for moving the brake means to the released position on movement of the throttle operating means from the idle position toward the full throttle position to thereby enable said clutch means to provide a driving connection between the drive shaft and the blade, said brake actuating means including a first abutment on said cable means, said brake means having a second abutment to be engaged by said first abutment on movement of said throttle operating means from the idle position toward the full throttle position, said abutments being spaced apart when the throttle operating means is in the idle position.

* * * * *